(12) United States Patent
Helmstetter et al.

(10) Patent No.: US 8,210,564 B2
(45) Date of Patent: Jul. 3, 2012

(54) INTERIOR LINING PART FOR A MOTOR VEHICLE

(75) Inventors: Matthias Helmstetter, Aschaffenburg (DE); Reinhard Schulze, Usingen (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 263 days.

(21) Appl. No.: 12/621,717

(22) Filed: Nov. 19, 2009

(65) Prior Publication Data

US 2010/0123300 A1 May 20, 2010

(30) Foreign Application Priority Data

Nov. 19, 2008 (DE) .......................... 10 2008 057 972

(51) Int. Cl.
*B60R 21/20* (2011.01)
(52) U.S. Cl. ....................................... 280/728.3; 428/31
(58) Field of Classification Search .................... 428/31; 362/488; 280/728.3, 731; 40/593
See application file for complete search history.

(56) References Cited

U.S. PATENT DOCUMENTS

| | | | | |
|---|---|---|---|---|
| 5,516,143 A | * | 5/1996 | Lang et al. | 280/728.3 |
| 7,914,037 B2 | * | 3/2011 | Schulze | 280/728.3 |
| 2001/0052690 A1 | * | 12/2001 | Nishiura et al. | 280/728.3 |
| 2003/0209889 A1 | * | 11/2003 | Erwin et al. | 280/728.3 |
| 2008/0090031 A1 | * | 4/2008 | Hirzmann | 428/31 |

FOREIGN PATENT DOCUMENTS

| | | |
|---|---|---|
| DE | 19936982 | 3/2001 |
| DE | 10332975 | 2/2005 |

* cited by examiner

*Primary Examiner* — Paul N Dickson
*Assistant Examiner* — Robert A Coker
(74) *Attorney, Agent, or Firm* — Tarolli, Sundheim, Covell & Tummino LLP

(57) ABSTRACT

A vehicle interior decor element, in particular an air bag cover, comprising a front side (36) facing the vehicle interior and an opposite rear side (34), a cover (18) and a decorative element (20) which is provided at the cover (18), is visible from the front and is at least partly translucent. The decorative element (20) includes sections (24) between which the decorative element (20) has a gap (26) through which the cover (18) is accessible from the front side (36). The decorative element (20) extends with at least one portion (44) thereof towards the rear side (34) towards or into a cavity (42) which is formed in the cover (18) and in which an illuminant (50) for illuminating the decorative element (20) is accommodated.

24 Claims, 2 Drawing Sheets

INTERIOR LINING PART FOR A MOTOR VEHICLE

RELATED APPLICATIONS

This application claims the benefit of German Patent Application Ser. No. DE 10 2008 057 972.6, filed Nov. 19, 2008, the entirety of which is incorporated herein by reference.

FIELD OF THE INVENTION

The invention relates to a vehicle interior decor element, in particular an air bag cover

BACKGROUND OF THE INVENTION

Parts of a vehicle's interior decor (lining) are often equipped with illuminated decorative elements so as to give the vehicle interior an individual appearance. Owing to stringent safety requirements for today's vehicles, however, increasingly often air bags are disposed beneath the vehicle interior decor which, in case of activation, for instance, in the event of a collision, tear open the vehicle interior decor and unfold into the vehicle interior. In case of activation of the air bag and subsequent tearing open of the vehicle interior decor it must be ensured that the decorative elements attached to the vehicle decor remain properly fastened to it.

SUMMARY OF THE INVENTION

The invention provides an interior decor (lining) part for a motor vehicle including an illuminated decorative element which, in case of deployment, remains firmly locked in position at the vehicle interior decor element.

According to the invention, an interior lining part for a motor vehicle is provided to this end, in particular an air bag cover comprising a front side facing the vehicle interior and an opposite rear side, a cover and a decorative element which is provided at the cover, is visible from the front and is at least partly translucent. The decorative element includes sections between which the decorative element has a gap through which the cover is accessible from the front side. The decorative element extends with at least one portion thereof towards the rear side where an illuminant for illuminating the decorative element is arranged. The sections and the intermediate gaps allow for a number of design options for the decorative element, with the visual appearance of the surface of the cover being preserved.

The cover is preferably a multi-part cover which comprises a cover plate having an opening surrounding the decorative element and comprises a closing member which is fastened to the cover plate from the rear side thereof. By using a closing member with the decorative elements held thereon it is possible to attach the decorative element to the firm cover plate and to subsequently close the opening for the decorative element in the cover plate. The closing member may be of the same material and have the same surface structure as the cover plate so that the multi-part structure of the cover is not visible.

Preferably, the decorative element extends with one portion thereof towards or into a cavity which is formed in the cover and which accommodates an illuminant for illuminating the decorative element. By means of the portion projecting into the cavity the decorative element is securely held at the cover so that the decorative element is securely locked in position at the vehicle interior lining part in the event of a collision.

In this embodiment, the cavity may be defined between the cover plate and the closing member. The cover plate and the closing member each include recesses which, when the two parts are assembled, add up to form the cavity. This eliminates complex forming of the cavity during manufacture of the cover plate or of the closing member. Moreover, prior to assembly of the cover plate and the closing member the decorative element may be positioned at one of the components such that it projects into the cavity upon assembly.

So as to form a tight seal towards the front side, the decorative element is, by its portion extending towards or into the cavity, joined to the cover plate preferably by means of a material connection. The illuminant accommodated in the cavity as well as further parts lying underneath are thus protected against outside influences, for instance, dust or moisture.

However, the closing member may also include a recess which defines the cavity in sections and which is closed towards the front by the cover plate and the decorative element. The illuminant is thus mounted on the closing member already prior to assembly of the closing member and the cover plate which facilitates manufacture of the interior lining part for a motor vehicle.

So as to close the multi-part cover towards the rear side, the recess is preferably delimited by an outer wall of the closing member, the outer wall being attached to the cover plate.

In order to obtain a firm material connection without any additional fasteners, the closing member is attached to the cover plate, for instance, by means of a welding method.

Preferably, the welding method is a heated tool welding method. In this method, one or both joining surfaces are heated by a heated tool until they melt. Subsequently, the heated tool is removed and the joining surface are pressed against each other until the molten material has cooled. Due to hardening of the molten material a material connection is established. This method permits the greatest possible freedom to design the geometry of the joining surfaces since no direct access to the joining surfaces is necessary during assembly.

The portion protruding into the cavity is preferably designed as circumferential ring. The annular portion forms a strong outer frame of the decorative element bordered by the sections of the decorative element.

Preferably, the ring comprises a circumferential flange which projects radially outwardly and into the cavity.

So as to establish a form-locking support of the decorative element, this flange may, for instance, engage into a lateral undercut in the cavity.

In order to facilitate assembly of the interior lining part for a motor vehicle the illuminant is, for instance, held at the decorative element. Preferably, the illuminant is attached to the flange.

Depending on the space available, the illuminant is, for instance, at least partly arranged on the front side of the flange.

However, it is also conceivable that the illuminant is at least partly arranged on the rear side of the flange.

Differing from this, the illuminant may also (under certain conditions additionally) be held at the cover.

Depending on the desired appearance of the decorative element and the mounting conditions, the vehicle interior lining part for a motor vehicle may be produced with different illuminants.

So as to achieve a high luminance, the illuminant may, for instance, include at least one LED.

If a low installation height is desired, it is also conceivable that the illuminant comprises a luminous film.

Preferably, the illuminant is directly mounted on a printed board. The printed board may include an electronic control for the illuminant. The control is arranged within the cavity, i.e. within the cover, such that it is also securely supported. Moreover, in this embodiment, the cover is formed as a closed unit. The control allows for additional color effects, for instance to adapt the brightness of the illumination to the ambient light.

So as to obtain a uniform illumination of the decorative element, the decorative element is at least partly made of a light-conducting material. The light-conducting material conducts light from the illuminant arranged in the cavity to the front side. Thus, the illuminant may also be positioned so as to be concealed, for instance in an undercut.

Further design options are made possible by providing the decorative element at least partly with a semi-transparent coating.

However, instead of the semi-transparent coating, the decorative element may also partly include a light-impervious blocking print.

The invention further relates to a steering wheel including an interior lining part for a motor vehicle according to the invention.

Preferably, the steering wheel includes an air bag and the interior lining part for a motor vehicle is an air bag cover. Owing to its sturdy configuration and flat design the interior lining part for a motor vehicle according to the invention is suitable for such an air bag cover.

BRIEF DESCRIPTION OF THE DRAWINGS

Further advantages and features of the invention will be apparent from the following description with particular reference to the accompanying drawings, in which.

DESCRIPTION OF EXAMPLE EMBODIMENTS

Figure 1:
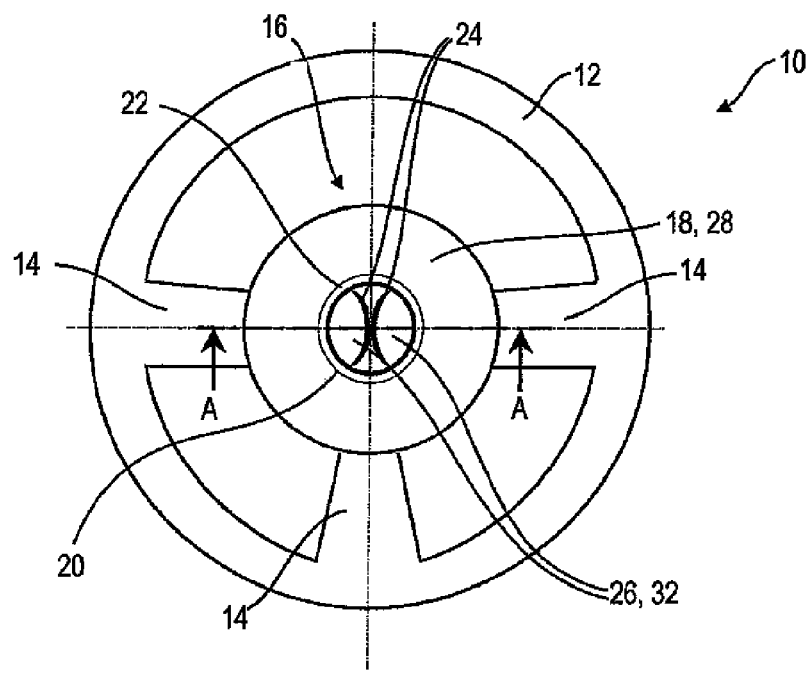
FIG. 1 shows a steering wheel according to the invention including an interior lining part for a motor vehicle according to the invention.

The steering wheel 10 shown in FIG. 1 includes a steering wheel rim 12 as well as three spokes 14. At the center of the hub a vehicle interior decor element 16 including a cover 18 is provided. Here, the cover 18 is an air bag cover of an air bag module. On the center of the cover 18, a decorative element 20 is provided. The decorative element 20 includes here a circumferential ring 22 visible from the front as well as several sections 24 (here bars) between which gaps 26 are formed, respectively. Through these gaps 26 the front side of the cover 18 is accessible. Thus, the sections 24 are elevated as compared to the adjoining cover 18.

Figure 2:
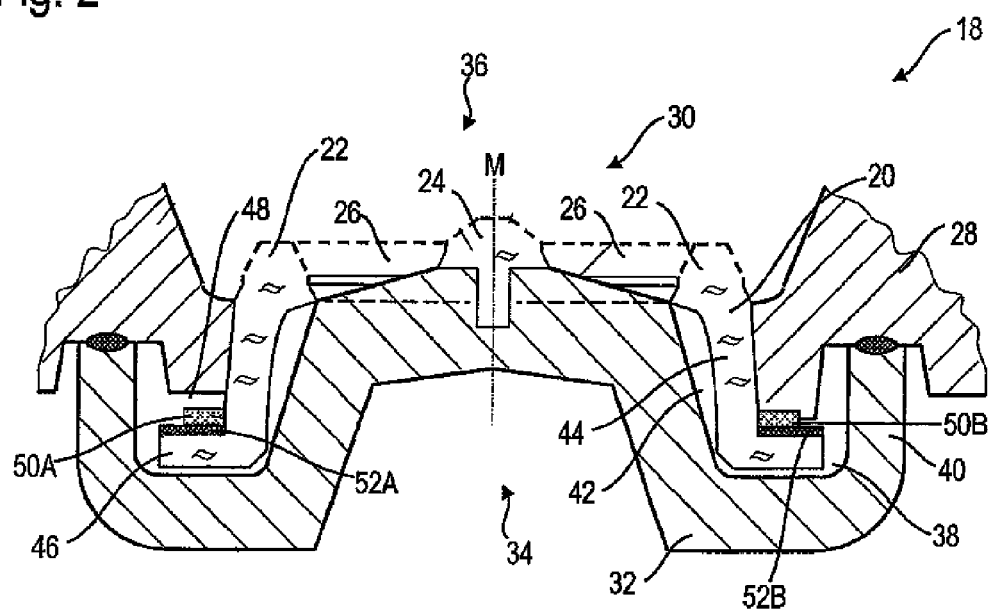
FIG. 2 is sectional view of the interior lining part for a motor vehicle of FIG. 1 including two embodiments of the illuminant (left and right half)

FIG. 2 shows a detailed view of the interior lining part for a motor vehicle 16 as a section through the plane A-A. In this figure, as also in FIG. 3, two embodiments of the interior lining part for a motor vehicle 16 are shown, respectively.

Figure 3:
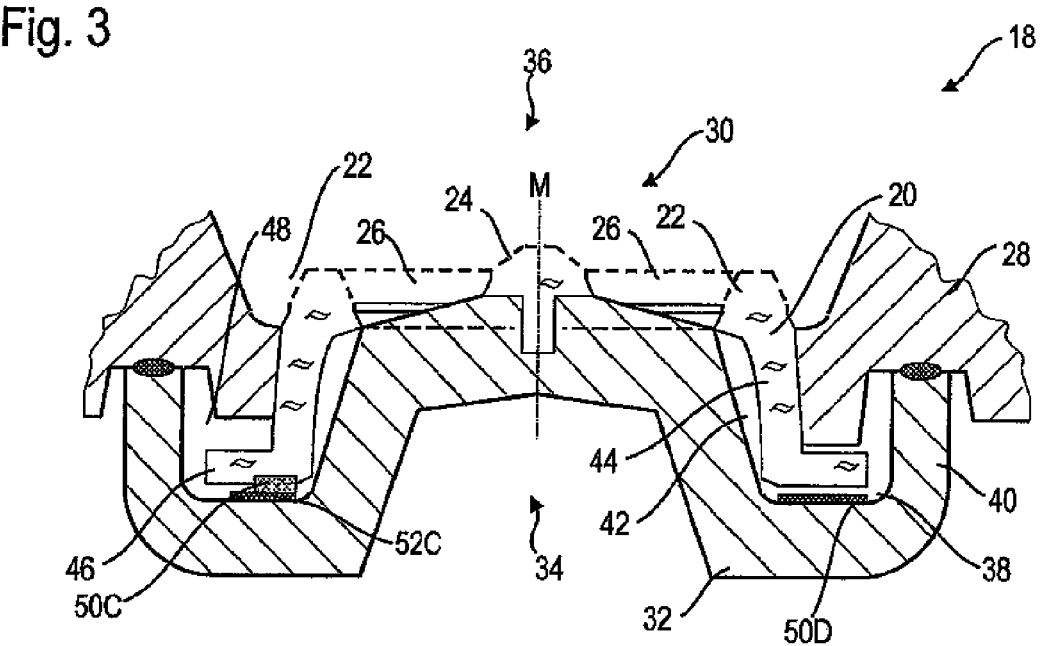
FIG. 3 represents a further sectional view of the interior lining part for a motor vehicle of FIG. 1 including two further embodiments of the illuminant (left and right half).

The basic structure as well as the individual components of the interior lining part for a motor vehicle 16 are basically identical in all embodiments depicted in FIGS. 2 and 3. Thus, they will first be explained in general before the differences between the embodiments will then be set out. The components are basically also identical so that like components are numbered alike. The different variants of the embodiments are each marked separately.

The cover 18 comprises a cover plate 28 having a central opening 30 and it comprises a closing member 32 which is fastened to the cover plate 28 from the rear side 34 thereof, preferably in a material connection. The front side 36 of the cover 18 is defined here as that side which faces the vehicle interior. Accordingly, the rear side 34 is the opposite side. As can be seen in FIG. 2, the closing member 32 of the cover 18 is accessible and visible through the gaps 26 of the decorative element 20.

The closing member 32 has a circumferential recess 38 and is, by a cylindrical outer wall 40 thereof, attached to the cover plate 28. Here, the outer wall 40 of the closing member 32 is joined in a material connection to the cover plate 28 by means of a welding method, in this case a heated tool welding method, such that the interior lining part for a motor 16 is completely closed towards the rear side 34.

The recess 38, in conjunction with the cover plate 28 and the decorative element 20, defines a cavity 42 into which a portion 44 of the decorative element 20 protrudes. Here, portion 44 is formed as a ring and has a circumferential, laterally protruding flange 46 which engages into a lateral undercut 48 formed by cover plate 28. The annular portion 44 of the decorative element 20 is joined in a material connection to the cover plate 28. The cavity 42 defined by the recess 38 is thus closed both towards the rear side 34 and the front side 36.

In cavity 42 defined by recess 38 an illuminant 50A, B is provided which is mounted on a printed board 52A, B. Here the decorative element 20, in particular the annular portion 44, is made of a light-conducting synthetic material. Thereby, the light emitted by the illuminant 50 is conducted to the front side 36 of the decorative element 20.

In the following, the different embodiments of the illuminant 50 and of the printed circuit board 52 of the interior lining part for a motor vehicle 16 shall be explained in more detail. It shall be pointed out that here one figure shows two embodiments (left and right half). Yet, combinations of the different variants are also possible.

The illuminant 50A in the embodiment shown to the left of center line M is directly mounted on a printed board 52A. The printed board 52A is located on the side of the flange 46 facing the front side 36 and is held at a distance from the cover 18 and the cover plate 28.

In the second variant shown in FIG. 2 to the right of center line M, the illuminant 50B is likewise provided on the side of the flange 46 facing the front side 36 and held on a printed board 52B. Differing from the first embodiment, however, the illuminant 50B abuts on the cover plate 28 of the cover 18. The illuminant may, for instance, also be held at the cover plate 28.

Two further embodiments of the interior lining part for a motor vehicle are shown in FIG. 3. In the variant shown to the right of center line M the illuminant 50C as well as the printed board 52C are provided on the side of the flange 46 facing the rear side 34. The printed board is held at the closing member 32, the illuminant 50C rests flatly against the decorative element 20.

As shown to the left of the center line M, also embodiments without a printed board 52 are possible. Here, the illuminant 50D is a luminous film held directly at the closing member 32.

Differing from this design, also further embodiments are possible. The illuminant 50 or the printed board 52 may be disposed in the cavity 42 in any desired manner. For instance, it is possible to mount them exclusively on the cover 18 or on the cover plate 28.

Any known illuminant 50 may be used as illuminant 50. Instead of the luminous film shown here, the illuminant 50 may, for instance, also comprise an LED.

The printed board 52 may, for instance, also include an electronic control of the illuminant 50 so as to obtain further light effects, for instance a variable light intensity. However, this control may also be disposed outside the cavity 42 or outside the interior lining part for a motor vehicle 16.

The decorative element 20 may also have any desired shape. In particular, the decorative element 20 does not have to comprise a circumferential annular portion 44. The portion 44 protruding into the cavity 42 may also have any other desired shape. In particular, also several portions 44 may be provided.

Also, the portion 44 does not have to include a circumferential flange 46.

Likewise, the cavity 42 into which the portion 44 engages does not have to be defined by a recess of the closing member 32. The cavity 42 may, for instance, also be defined between the cover plate 28 and the closing member 32. In particular, the cavity 42 does not have to include an undercut 48.

Moreover, the cavity 42 does not have to be defined between the cover plate 28 and the closing member 32. The cavity 42 may also be formed at the cover plate 28 or at the closing member 32.

Instead of employing the heated tool welding method shown here, the cover plate 28 and the closing member 32 may be joined by means of any other method. In particular, the method does not have to be a welding method.

Furthermore, the interior lining part for a motor vehicle 16 shown here does not have to be mounted on a steering wheel 10. The interior lining part for a motor vehicle 16 is also suitable for other areas of the vehicle interior. In particular, the interior lining part for a motor vehicle 16 does not have to be an air bag cover.

The decorative element 20 may additionally be provided with a semi-transparent coating or with a light-impervious blocking print. This offers additional design options for the decorative element 20.

The invention claimed is:

1. A vehicle interior decor element (16) comprising: a cover (18) having a front side (36) facing the vehicle interior and an opposite rear side (34) and a decorative element (20) which is provided at said cover (18), is visible from the front side (36) and is at least partly translucent, wherein said decorative element (20) includes sections (24) between which said decorative element (20) has a gap (26) through which said cover (18) is accessible from said front side (36), wherein said decorative element (20) extends with at least one portion (44) thereof towards said rear side (34) where an illuminant (50) for illuminating said decorative element (20) is provided.

2. The vehicle interior decor element according to claim 1, wherein said cover (18) is a multi-part cover which comprises a cover plate (28) having an opening (30) surrounding said decorative element (20) and a closing member (32) fastened to said cover plate (28) from said rear side (34) thereof.

3. The vehicle interior decor element according to claim 2, wherein said cavity (42) is defined between said cover plate (28) and said closing member (32).

4. The vehicle interior decor element according to claim 2, wherein said closing member (32) has a recess (38) which defines said cavity (42) in sections and which is closed by said cover plate (28) and said decorative element (20) towards the front.

5. The vehicle interior decor element according to claim 4, wherein said recess (38) is delimited by an outer wall (40) of said closing member (32), said outer wall (40) being attached to said cover plate (28).

6. The vehicle interior decor element according to claim 2, wherein said closing member (32) is attached to said cover plate (28) by means of a welding method.

7. The vehicle interior decor element according to claim 6, wherein the welding method is a heated tool welding method.

8. The vehicle interior decor element according to claim 1, wherein said at least one portion (44) extends towards or into a cavity (42) which is formed in said cover (18) and which accommodates said illuminant (50).

9. The vehicle interior decor element according to claim 8, wherein said decorative element (20) is, by its portion (44) extending towards or into said cavity (42), joined in a material connection to said cover plate (28).

10. The vehicle interior decor element according to claim 8, wherein a circumferential flange (46) is provided on said portion 44, said flange (40) protruding radially outwardly and into said cavity (42).

11. The vehicle interior decor element according to claim 10, wherein said flange (46) engages into a radial undercut (48) in said cavity (42).

12. The vehicle interior decor element according to claim 10, wherein said illuminant (50) is attached to said flange (46).

13. The vehicle interior decor element according to claim 10, wherein said illuminant (50) is at least partly arranged on the front side (36) of said flange (46).

14. The vehicle interior decor element according to claim 10, wherein said illuminant (50) is at least partly arranged on the rear side (34) of said flange (46).

15. The vehicle interior decor element according to claim 1, wherein said portion (44) is formed as a circumferential ring (22).

16. The vehicle interior decor element according to claim 1, wherein said illuminant (50) is held at said cover (18).

17. The vehicle interior decor element according to claim 1, wherein said illuminant (50) comprises at least one LED.

18. The vehicle interior decor element according to claim 1, wherein said illuminant (50) comprises a luminous film.

19. The vehicle interior decor element according to claim 1, wherein said illuminant (50) is directly mounted on a printed board (52) including an electronic control for said illuminant (50).

20. The vehicle interior decor element according to claim 1, wherein said decorative element (20) is at least partly made of a light-conducting material.

21. The vehicle interior decor element according to claim 1, wherein said decorative element (20) is at least partly provided with a semi-transparent coating.

22. The vehicle interior decor element according to claim 1, wherein said decorative element (20) is partly provided with a light-impervious blocking print.

23. A steering wheel (10) comprising a vehicle interior decor element (16) according to claim 1.

24. The steering wheel according to claim 23, wherein said steering wheel (10) includes an air bag and that said vehicle interior decor element (16) is an air bag cover.

* * * * *